(12) United States Patent
Nishi

(10) Patent No.: US 7,764,337 B2
(45) Date of Patent: Jul. 27, 2010

(54) LIQUID CRYSTAL DISPLAY DEVICE AND ELECTRONIC DEVICE

(75) Inventor: Takeshi Nishi, Atsugi (JP)

(73) Assignee: Semiconductor Energy Laboratory Co., Ltd, Atsugi-shi, Kanagawa-ken (JP)

( * ) Notice: Subject to any disclaimer, the term of this patent is extended or adjusted under 35 U.S.C. 154(b) by 508 days.

(21) Appl. No.: 11/258,245

(22) Filed: Oct. 26, 2005

(65) Prior Publication Data
US 2006/0092369 A1    May 4, 2006

(30) Foreign Application Priority Data
Oct. 28, 2004    (JP) .............................. 2004-313717

(51) Int. Cl.
*C09K 19/02*    (2006.01)
(52) U.S. Cl. .............................. 349/72; 349/86; 349/87; 349/88; 349/89; 349/90; 349/91; 349/166
(58) Field of Classification Search .................. 349/172, 349/86–91
See application file for complete search history.

(56) References Cited

U.S. PATENT DOCUMENTS

| | | | |
|---|---|---|---|
| 4,367,924 A | | 1/1983 | Clark et al. |
| 5,253,090 A | * | 10/1993 | Yamazaki et al. .............. 349/90 |
| 5,301,046 A | | 4/1994 | Konuma et al. |
| 5,410,424 A | * | 4/1995 | Konuma et al. ................ 349/90 |
| 5,420,706 A | | 5/1995 | Yamazaki et al. |
| 5,473,449 A | * | 12/1995 | Takemura et al. .............. 349/49 |
| 5,474,629 A | | 12/1995 | Yamazaki et al. |
| 5,525,273 A | | 6/1996 | Konuma et al. |
| 5,540,858 A | * | 7/1996 | Yoshinaga et al. ..... 252/299.01 |
| 5,541,749 A | | 7/1996 | Konuma et al. |
| 5,566,009 A | | 10/1996 | Yamazaki et al. |
| 5,619,353 A | * | 4/1997 | Yamazaki et al. .............. 349/89 |
| 5,644,372 A | * | 7/1997 | Shinjo et al. ................. 349/139 |
| 6,040,884 A | * | 3/2000 | Yasuda et al. ................ 349/129 |

(Continued)

FOREIGN PATENT DOCUMENTS

JP    01142713 A    *    6/1989

(Continued)

OTHER PUBLICATIONS

Y. Reznikov et al., "Ferroelectric Nematic Suspension," J. West, Applied Physics Letters, vol. 82, No. 12, 1917, Mar. 24, 2003.

*Primary Examiner*—David Nelms
*Assistant Examiner*—Thanh-Nhan P Nguyen
(74) *Attorney, Agent, or Firm*—Eric J. Robinson; Robinson Intellectual Property Law Office, P.C.

(57) ABSTRACT

It is an object of the present invention to improve deterioration of display performance in a liquid crystal display device, especially to obtain rapid response with the alignment of a liquid crystal maintained. According to one feature of the present invention, a liquid crystal display device comprises a pair of substrates where an electrode is formed in one side of each substrate; liquid crystals; and a ferroelectric, wherein the pair of substrates is disposed so that the electrodes oppose to each other, wherein the liquid crystal is sandwiched between the pair of substrates, wherein the ferroelectric includes an organic material and wherein the ferroelectric particles are dispersed in the liquid crystal.

35 Claims, 4 Drawing Sheets

U.S. PATENT DOCUMENTS

2002/0033785 A1* 3/2002 Iwakura et al. ............... 345/84
2006/0250545 A1* 11/2006 Hsieh et al. .................. 349/86

FOREIGN PATENT DOCUMENTS

| JP | 02051325 U | * | 4/1990 |
| JP | 05-281580 | | 10/1993 |
| JP | 11-264979 | | 9/1999 |
| JP | 2001-264807 | | 9/2001 |
| JP | 2001-337332 | | 12/2001 |

* cited by examiner

LIQUID CRYSTAL DISPLAY DEVICE AND
ELECTRONIC DEVICE

FIELD OF THE INVENTION

The present invention relates to a display device using a liquid crystal.

DESCRIPTION OF THE RELATED ART

A display device using a liquid crystal material is used widely as a lightweight and thin display device. In this display device, the liquid crystal material is sandwiched between two flat plates including a glass substrate and the like, an electric field is applied by an electrode disposed at least on one plane of the flat plates where the liquid crystal is disposed, and liquid crystal molecules are switched depending on the strength and existence of the electric field, which changes optical properties of the liquid crystal. Therefore, display and the like of images are preformed by utilizing the change in optical properties.

A nematic liquid crystal is generally used as a liquid crystal material used for a liquid crystal element. A nematic liquid crystal refers to one of classifications that are distinguished according to an alignment state of liquid crystal molecules included in a liquid crystal material. Besides, there is also a material such as a smectic liquid crystal, for example. However, a nematic liquid crystal is liquid in an operating temperature range, which has fluidity, and is widely used for display in terms of ease of initial alignment and stability in alignment of liquid crystal molecules and a wide operating temperature range.

There are few residual images when a moving image is displayed, which is given as one element to decide display performance of a display. The residual image herein is a fuzzy image state visible when a moving image is displayed but unnoticeable in a still image. It is considered that a response speed of several ms or less is desirable as responsiveness of a liquid crystal that is needed in order to eliminate the residual image. However, it takes up to several 10 ms depending on a driving condition when a nematic liquid crystal is used; thus, it is desirable to improve the response speed.

A liquid crystal display device using a ferroelectric liquid crystal is suggested as a method for improving a response speed (for example, see Reference 1: Japanese Patent Application Laid-Open No. H5-281580).

However, in the above ferroelectric liquid crystal, an alignment defect of a liquid crystal material is easily generated, and a place in a light state is generated even with black display by light leakage that is generated due to light that transmits this alignment defect; therefore, contrast is easily deteriorated.

In addition, as another method, a method for mixing inorganic ferroelectric particles into a nematic liquid crystal is suggested (for example, see Reference 2: Y. Reznikov, O. Buchnev, O. Tereshchenko, V. Reshetnyak, A. Glushchenko, J. West, Appl. Phys. Lett., Vol. 82, No. 12, 1917 (2003)).

SUMMARY OF THE INVENTION

In the above case of mixing an inorganic ferroelectric into a nematic liquid crystal, the ferroelectric is (inorganic matter) with high hardness; thus, the inventor recognize that there is a problem of difficulty in processing the ferroelectric into an appropriate state before mixing into the liquid crystal.

Moreover, in the above case of mixing an inorganic ferroelectric into a nematic liquid crystal, the inventor recognize that there is a problem of the ferroelectric particles, which change to have different concentrations depending on the place as the time passes, especially when a liquid crystal display device is used in a vertical state.

It is an object of the present invention to improve such deterioration of display performance, especially to obtain rapid response with the alignment of a liquid crystal maintained.

According to one aspect of the present invention, a liquid crystal display device comprises a pair of substrates where an electrode is formed in one side of each substrate; a liquid crystal; and a ferroelectric, wherein the pair of substrates is disposed so that the electrodes oppose to each other, wherein the liquid crystal is sandwiched between the pair of substrates, wherein the ferroelectric includes an organic material (organic matter), and wherein the ferroelectric particles are dispersed in the liquid crystal.

In addition, according to another aspect of the present invention, a liquid crystal display device comprises a pair of substrates where an electrode is formed in one side of each substrate; a liquid crystal; and a ferroelectric, wherein a protrusion is formed in one of the electrodes, wherein the pair of substrates is disposed so that the electrodes oppose to each other, wherein the liquid crystal is sandwiched between the pair of substrates, and wherein the ferroelectric particles are dispersed in the liquid crystal.

Moreover, according to another aspect of the present invention, a liquid crystal display device comprises a pair of substrates where an electrode is formed in one side of each substrate; a liquid crystal; and a ferroelectric, wherein a protrusion is formed in one of the electrodes, wherein the pair of substrates is disposed so that the electrodes oppose to each other, wherein the liquid crystal is sandwiched between the pair of substrates, wherein the ferroelectric includes an organic material, and wherein the ferroelectric particles are dispersed in the liquid crystal.

Further, according to another structure of the present invention, a liquid crystal display device comprises a pair of substrates where an electrode is formed in one side of each substrate; a liquid crystal; and a ferroelectric, wherein an active element is formed in one of the pair of substrates, wherein a protrusion is formed in one of the electrodes, wherein the pair of substrates is disposed so that the electrodes oppose to each other, wherein the liquid crystal is sandwiched between the pair of substrates, wherein the ferroelectric includes an organic material, and wherein the ferroelectric particles are dispersed in the liquid crystal.

Still further, according to the other aspect of the present invention, a liquid crystal display device comprises a pair of substrates where an electrode is formed in one side of each substrate; a liquid crystal; and a ferroelectric, wherein a plurality of electrodes and an active element is formed in one of the pair of substrates, wherein a protrusion is formed between the plurality of electrodes, wherein the pair of substrates is disposed so that the electrodes oppose to each other, wherein the liquid crystal is sandwiched between the pair of substrates, wherein the ferroelectric includes an organic material, and wherein the ferroelectric particles are dispersed in the liquid crystal.

Note that a copolymer (P) of vinylidene fluoride (VDF)/trifluoroethylene (TrFE) can be used as the ferroelectric in the above structure. In addition, it is desirable that the size of the ferroelectric is smaller than the space where the liquid crystal is formed. Moreover, the ferroelectric is preferably a particle of which diameter is 4 μm or less. Further, the weight ratio of the ferroelectric dispersed in the liquid crystal is 40% or less with respect to the liquid crystal material.

According to the aspects of the present invention, a response speed can be improved, a residual image can be decreased, and display performance can be improved.

Furthermore, ferroelectric particles are mixed into a liquid crystal material in the present invention. However, by providing a protrusion, it is possible to prevent to generate a biased distribution of the particles in the liquid crystal material due to the influence of temperature or an installation circumstance within a liquid crystal display device, and to prevent bias in mixture ratio of the entire display region because the moving range of the particles is limited to the region surrounded with the protrusion, a pixel electrode, and an opposite substrate.

These and other objects, features and advantages of the present invention will become more apparent upon reading of the following detailed description along with the accompanied drawings.

DETAILED DESCRIPTION OF THE INVENTION

EMBODIMENT MODE 1

Figure 1:
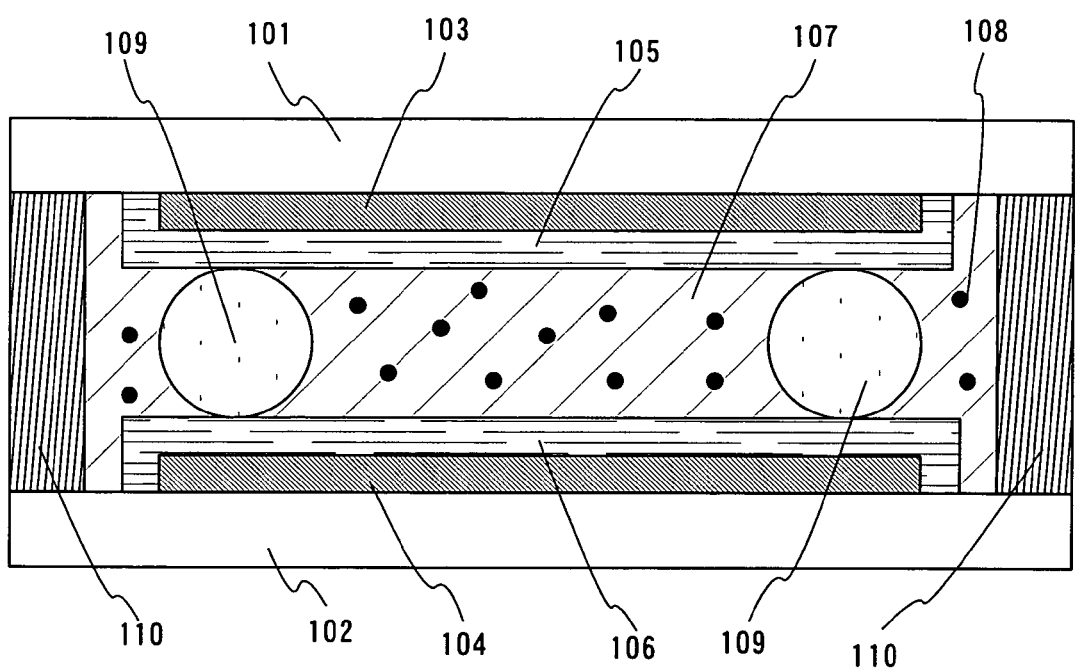
FIG. 1 is a cross-sectional view of a liquid crystal display device according to a certain aspect of the present invention.

An embodiment mode of a liquid crystal display device of the present invention is explained with reference to drawings. FIG. 1 is a cross-sectional view of a liquid crystal display device of the present invention, which shows one embodiment mode of the present invention. Reference numerals 101 and 102 each denote a substrate; 103 and 104, an electrode; 105 and 106, an alignment film; 107, a liquid crystal layer; 108, an organic ferroelectric; 109, a spacer; and 110, a sealant.

A material that can transmit visible light, for example, glass, plastics, or quartz can be used as the substrates 101 and 102. In the case of controlling optical modulation of a liquid crystal material with an electrical signal as in the present invention, the following electrode or dielectric film for insulating the electrode may be disposed over each surface of the substrates to have an arbitrary shape. However, such a material that satisfies heat resistance and chemical resistance is selected in order to form by processing the electrode or the dielectric film with a desired specification. In addition, it is sufficient that each thickness of the substrates is as thick as not to break the substrates themselves due to a physical shock in a processing step and even after the completion as a display element. A material in 2 mm thick or less is preferably used for a glass substrate, for example. In this respect, in the case of a plastic substrate, the substrate can be thinner than glass. Moreover, as for the light-transmitting properties of the substrates 101 and 102, the both substrates need to have light-transmitting properties in the case of using a liquid crystal display device as a transmitting type, whereas at least one of the substrates needs to have light-transmitting properties in the case of using a liquid crystal display device as a reflection type.

In addition, as for the substrates, it is desirable to use such a small substrate that can disregard anisotropy of a refractive index besides light-transmitting properties. This is to avoid unnecessary display properties such as having display with a different color tone depending on a viewing angle when the substrates include optical anisotropy other than that of a liquid crystal material.

A material having light-transmitting properties of visible light such as ITO is used for the electrodes 103 and 104. It is desirable that a portion using optical modulation of a liquid crystal material especially has transparency. In addition, as long as either one electrode has transparency, it is sufficient that the other electrode has conductivity, and light-transmitting properties are not a necessary condition.

In addition, a non-display portion or a wiring in order to supply an electrical signal does not always have to be a transparent electrode.

Moreover, FIG. 1 shows an element having a structure where there is only one pixel electrode within a region filled with a liquid crystal. However, there is no necessity to be fixed on this structure and there is no problem forming a plurality of pixels over a substrate having a region filled with a liquid crystal.

Figure 2A:
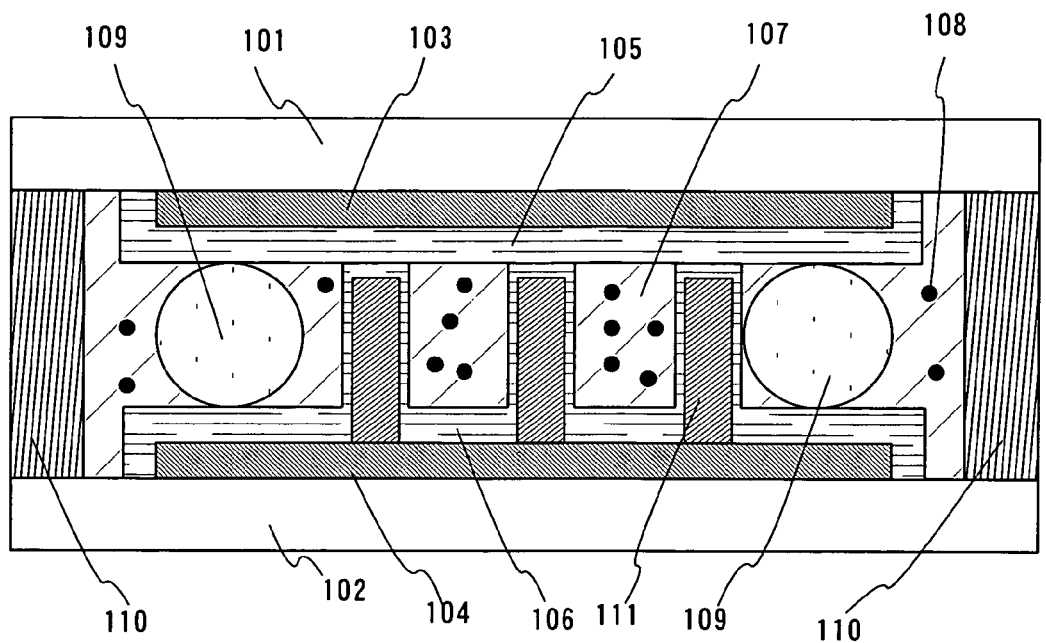
FIGS. 2A and 2B each are a cross-sectional view of a liquid crystal display device according to a certain aspect of the present invention.
Figure 2B:
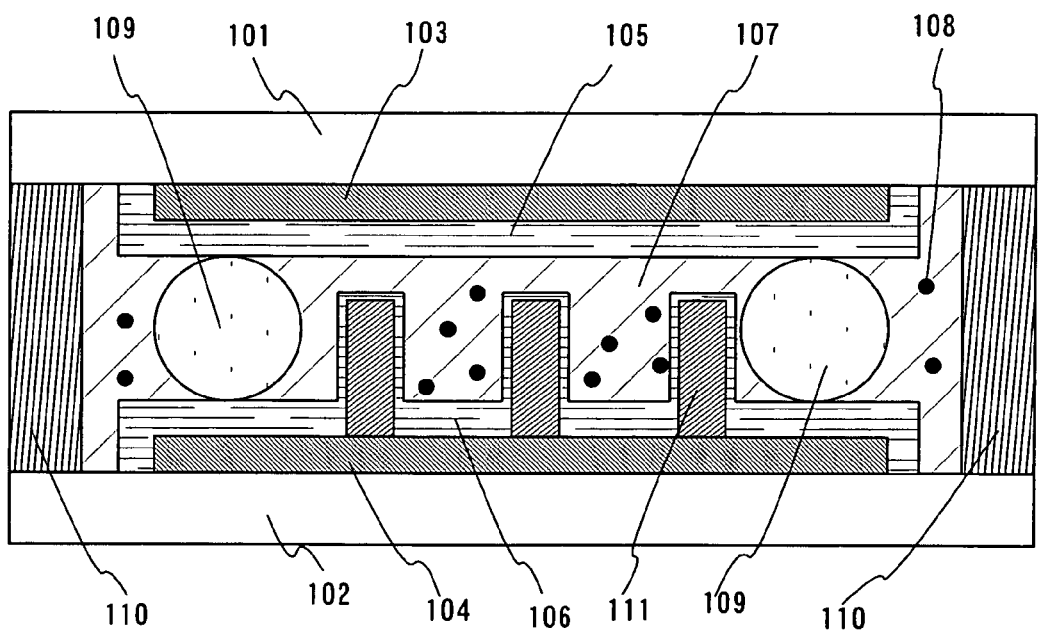

The alignment films 105 and 106 can be formed by using an organic material such as polyimide, DLC (diamond-like carbon), an inorganic material such as SiO. Alignment treatment in order to align a liquid crystal in a desired direction is performed to each surface of the alignment films 105 and 106, if necessary. The alignment treatment can be performed by utilizing rubbing treatment in which a surface of an alignment film is rubbed with fiber such as cloth. The planarity of a surface of an alignment film is adjusted appropriately depending on a liquid crystal to be used. Since a nematic liquid crystal has low viscosity, the alignment film may be plane, or may have unevenness as shown in FIGS. 2A and 2B because the liquid crystal aligns along the surface shape of an alignment film even when the surface is uneven.

Note that although the alignment films 105 and 106 may be formed from the same material, different materials may also be used for each depending on the alignment direction. In addition, as for the alignment treatment, the treatment does not always have to be performed in the same direction.

A method for performing alignment treatment to the alignment films is selected depending on a display mode of a liquid crystal. In a TN mode, an STN mode, or an IPS mode, the alignment treatment is performed so that the major axis of liquid crystal molecules aligns horizontally. On the other hand, in a VA mode, vertical alignment treatment is performed so that the major axis of liquid crystal molecules aligns vertically.

As for the alignment treatment, a rubbing method for rubbing each surface of the alignment films by cloth or the like in one direction may be employed, or optical alignment treatment for performing alignment treatment by irradiating light with the use of a photosensitive material may also be employed. In this case, a photoisomerization material or a photodimerization material is used as the photosensitive material, and azobenzene or the like can be used. The photosensitive material can be used by being mixed into the alignment films or by having the photosensitive part form a chemical bond with materials for forming the alignment films.

A nematic material can be used for a liquid crystal of the liquid crystal layer 107.

The organic ferroelectric particles 108 are dispersed in the liquid crystal layer 107. An organic material showing ferroelectricity, which is solid, can be used as the organic ferroelectric particles. P (VDF/TrFE) can be used as a specific example. Herein, VDF refers to vinylidene fluoride, TrFE refers to trifluoroethylene, and P (VDF/TrFE) refers to a copolymer thereof.

In addition, it is desirable that the size of the organic ferroelectric particles is space between the substrates 101 and 102 or less. Moreover, the particles are preferable to have each diameter of 4 μm or less. Further, as for the weight ratio of the organic ferroelectric particles dispersed in the liquid crystal, with so many organic ferroelectric particles, an aperture ratio, that is, a ratio of an area where the liquid crystal display gets less as well as the particles aggregate with each other; thus, it is not preferable to have so many organic ferroelectric particles. Therefore, it is desirable that the ratio is 40% or less in weight ratio with respect to the liquid crystal material.

Although the organic ferroelectric particles may each have the same diameter, there may be variation in the size of the particles without necessarily limiting thereto.

Moreover, the shape of the organic ferroelectric particles is preferably spherical; however, the particles are not limited to this shape, which may be an elliptical ball shape or further a shape whose surface has a depression such as porous particles.

The spacer 109 keeps a constant space between the substrates, and the one that can keep a desired space between the substrates is used. It is sufficient that the spacer has a spherical shape or a column shape. Alternatively, the spacer may be a constituent having a trapezoid cross-sectional shape.

The sealant 110 is formed to surround the liquid crystal material in order to attach the substrates and for the liquid crystal material not to flow outside the sealant. It is sufficient that the sealant is an adhesive, and a thermosetting material and a photo-curing material can be used. In addition, an epoxy resin, an acryl resin, or the like can be used.

A protrusion 111 may be formed over a pixel. FIGS. 2A and 2B each show a liquid crystal display device including the protrusion 111. The protrusion 111 is a constituent having a shape further protruded from the height of a surface of a pixel electrode, which may have a cylinder shape or a wall shape. Note that a word such as a column shape or a wall shape is used in this specification to liken the shape of the protrusion, and the word is included in the protrusion what is called in this specification. Within a display region, the wall-shape protrusion 111 may be formed in a plurality of linear and parallel wall shapes or may be disposed in a projection parallel shape so as to surround each pixel electrode completely. In addition, there may be space between walls instead of a wall shape that is closed completely. The protrusion 111 may be in contact with an opposite substrate as shown in FIG. 2A, or there may be a liquid crystal between the opposite substrate and the protrusion 111 as shown in FIG. 2B. The protrusion 111, column, and wall may be in the same cycle with the pixel. Moreover, part of the protrusion 111 may protrude over part of a region of the pixel electrode to the extent that display is not interrupted; however, the part of the protrusion 111 needs not to expand into the entire pixel electrode. Note that, after the protrusion 111 is formed over the electrode 104, the alignment film 106 is formed over the protrusion 111 as shown in FIG. 2A and FIG. 2B, respectively. However, after an alignment film is formed over an electrode, a protrusion may be formed over the alignment film. The protrusion can be said to be a constituent having a shape further protruded from the height of a surface of the alignment film.

An inorganic material or an organic material can be used as the protrusion 111. The inorganic material is $SiO_2$, SiN, SiON, or the like, and the organic material is an acrylic resin, an epoxy resin, a resist, divinylbenzene, or the like. Note that neighboring pixel electrodes cannot display when being not insulated; thus, the protrusion 111 needs to be an insulator.

The protrusion 111 may be formed by patterning a material for forming the protrusion 111 with photolithography after once depositing the material by a CVD method or a sputtering method. Alternatively, a printing method, an ink-jet method, a vapor deposition method, or the like may be used.

A liquid crystal layer 107 is disposed between a first substrate 101 and a second substrate 102. In the case of disposing the liquid crystal layer 107, it is preferably performed in vacuum. In addition, the second substrate 102 may be attached after dropping a liquid crystal to the first substrate 101. In particular, dropping a liquid crystal is preferable to injecting in the case of a large-sized substrate. Note that organic ferroelectric particles 108 are mixed into the liquid crystal layer.

EMBODIMENT MODE 2

Figure 3A:
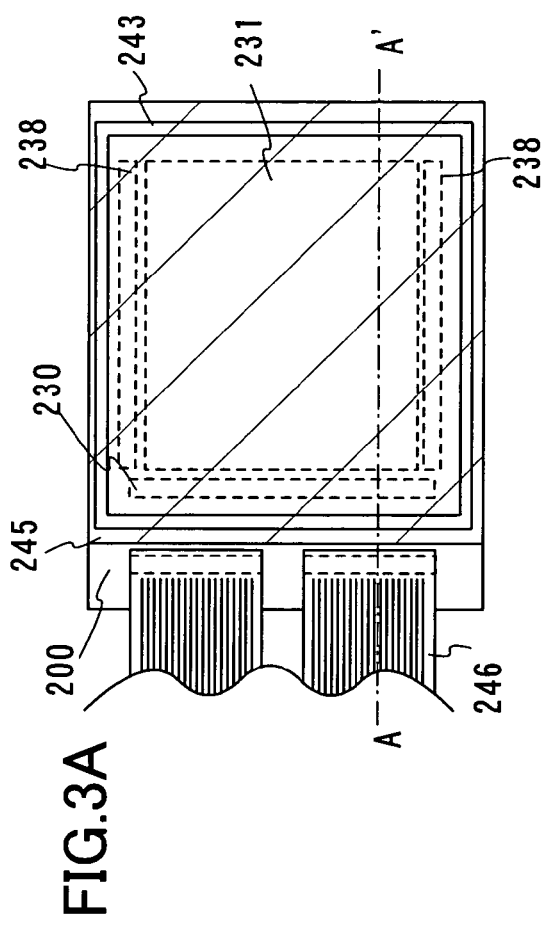
FIGS. 3A and 3B each are a cross-sectional view of a liquid crystal display device according to a certain aspect of the present invention.

An embodiment mode in which the present invention shown in this specification is applied to an active matrix liquid crystal display device is shown with reference to drawings. FIG. 3A shows a liquid crystal display device in which a signal-line driver circuit 230, a scanning-line driver circuit 238, and a pixel portion 231 are formed over a first substrate 200.

Figure 3B:
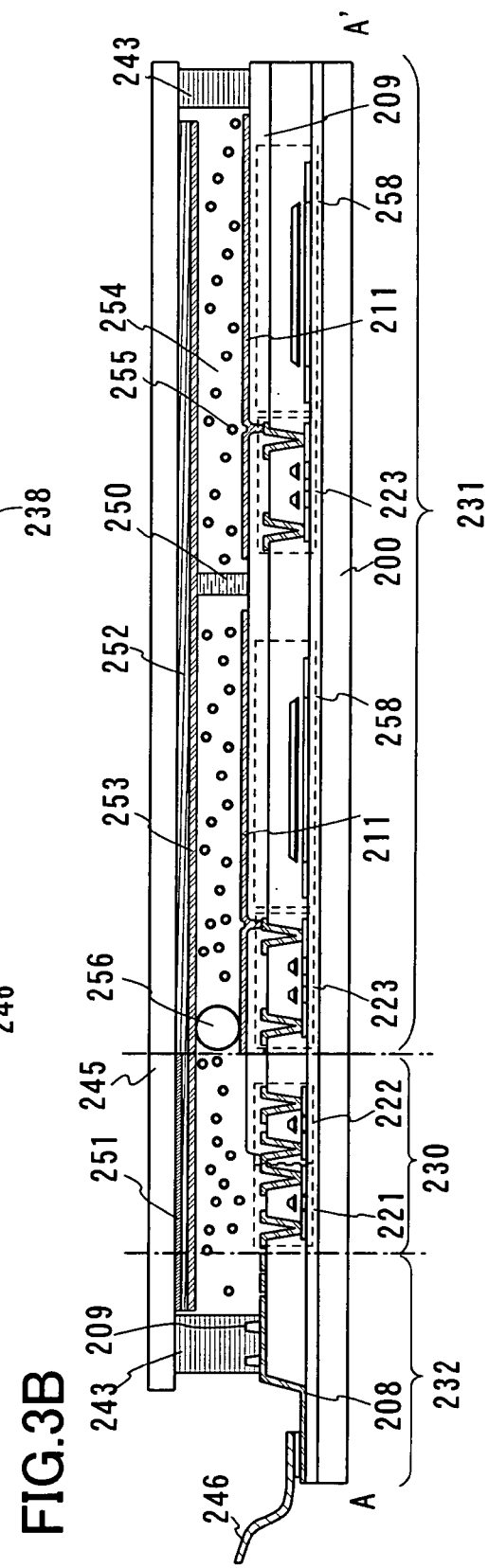

FIG. 3B shows a cross-sectional view taken along A-A' of the liquid crystal display device, and shows the signal-line driver circuit 230 provided with a CMOS circuit having an n-channel TFT 221 and a p-channel TFT 222 over the first substrate 200. The n-channel TFT 221 and the p-channel TFT 222 are preferably formed each to have a crystalline semiconductor film. TFTs for forming the signal-line driver circuit 230 and the scanning-line driver circuit 238 may be formed of a CMOS circuit, a PMOS circuit, or an NMOS circuit.

The pixel portion 231 has a switching TFT 223 and a capacitor element 258. The switching TFT 223 is preferably formed to have a crystalline semiconductor film. The capacitor element 258 includes a gate insulating film sandwiched between a semiconductor film added with impurities and a gate electrode.

Note that the TFTs in the pixel portion 231 do not need to have high crystallinity compared with the TFTs in the signal-line driver circuit 230 or the scanning-line driver circuit 238.

In addition, the pixel portion 231 has a pixel electrode 211 connected to one of the electrodes of the switching TFT 223. Then, a third insulating film 209 is formed so that the n-channel TFT 221, the p-channel TFT 222, the pixel electrode 211, the switching TFT 223, and the like are covered.

Moreover, a second substrate 245 to be an opposite substrate is prepared. In the second substrate 245, a black matrix 251 is provided at least in a position corresponding to the signal-line driver circuit 230, a color filter 252 is provided at least in a position corresponding to the pixel portion, and further an opposite electrode 253 is provided. In the present invention, it is not necessary to provide the second substrate 245 with the black matrix, the color filter, or the opposite electrode, which may be provided on the first substrate 200 side. Thereafter, a spacer 256 for holding space between the substrates may be formed. Further, a protrusion 250 for preventing liquid crystal material convection for the purpose of preventing a biased distribution of organic ferroelectric particles mixed into a liquid crystal material may be formed simultaneously. As for the spacer 256, a spherical one may be used or a so-called column spacer formed by etching an insulating film can be used. Furthermore, the protrusion 250 may be given the same function as that of the spacer 256 by having the height of the protrusion 250 to be the same as the thickness of a liquid crystal layer 254. Whether the spacer 256 and the protrusion 250 are formed separately or not is selected appropriately.

Next, an alignment film is formed to the second substrate 245 and alignment treatment is performed; thereafter, the second substrate is attached to the first substrate 200 by using a sealant 243. It is preferable to use an epoxy-based resin for the sealants 243. In addition, part of the third insulating film 209 may be left in the position where the sealant 243 is formed. Consequently, an attachment area gets larger; thus, the attachment intensity can be enhanced. Note that the spacer 256 for holding space between the substrates may be formed after performing alignment treatment to the alignment film.

The liquid crystal layer 254 is injected between the first substrate 200 and the second substrate 245. In the case of injecting the liquid crystal layer 254, it is preferably performed in vacuum. In addition, the second substrate 245 may be attached after dropping a liquid crystal to the first substrate 200. In particular, dropping a liquid crystal layer is preferable to injecting in the case of a large-sized substrate. Note that organic ferroelectric particles 255 are mixed into the liquid crystal layer.

In addition, it is preferable to increase contrast by appropriately providing the fist substrate 200 and the second substrate 245 each with a polarizing plate or a circularly polarizing plate.

Moreover, a flexible printed circuit 246 is connected to a conductive film 208 provided in a first connection region 232 through an anisotropic conductive resin (ACF). Then, a video signal or a clock signal to be an external input signal is received through the flexible printed circuit 246. Herein, only the flexible printed circuit is shown; however, a printed wiring board (PWB) is mounted through this flexible printed circuit. In addition, an external signal generating circuit is mounted on the printed wiring board.

Further, when the ACF is attached by applying pressure or heat, attention is necessary not to generate a crack because of flexibility of the flexible printed circuit and softening due to heat. For example, a substrate high in rigidity is preferably disposed as an adjunct at least below the first connection region 232.

This embodiment mode shows a driver-integrated display device in which the signal-line driver circuit 230 and the scanning-line driver circuit 238 are provided over the first substrate 200. However, the signal-line driver circuit and the scanning-line driver circuit, which are formed of an IC, may be connected to a signal line, a scanning line, or the like by an SOG method or a TAB method.

As explained above, a liquid crystal display device having an active matrix substrate can be manufactured.

EMBODIMENT 1

An element having one pixel is manufactured in order to evaluate optical properties of a liquid crystal material. A 0.7 mm thick glass substrate of which external shape is 2 cm×2 cm is used. An ITO film is formed as a transparent electrode in this glass substrate. The ITO film is used for electrodes that are patterned in a shape sized 2 mm×2 mm in order to operate a liquid crystal and for an extraction electrode that is patterned in order to apply an electric field externally to the liquid crystal. Polyimide is used as an alignment film for aligning the liquid crystal material. A thin film of polyimide is formed in 60 nm thick over the substrate. Rubbing treatment for rubbing a surface of a polyimide film with cloth and the like is performed to the surface of the polyimide film.

This substrate to which rubbing is performed is attached to a substrate by opposing a portion where an electrode is formed. Space between the pair of substrates is 5 µm. A sealant formed of an epoxy resin is used as a method for fixing the substrates by being attached to each other. The sealant is mixed with a cylindrical fiber containing $SiO_2$ as its main component. The diameter of the fiber is 5 µm. After attaching the opposite substrate, a surplus part of the substrates that does not display directly is cut off by using a glass scriber and a breaker to embody as an element.

A commercial ZLI4792 is used as a nematic liquid crystal. Particles of an organic high-molecular weight ferroelectric P (VDF/TrFE) are mixed into this liquid crystal as a ferroelectric. A pulverizer is used to have the particles of P (VDF/TrFE). It is possible to have the diameter of this material at least 4 µm or less by using a pulverizer. Although there are some ranges in this embodiment, the diameter is adjusted to be 100 nm as an average grain size. These P (VDF/TrFE) particles are mixed with the liquid crystal material. It is adjusted so that the mixture ratio of the liquid crystal is 99.5% in weight ratio, whereas P (VDF/TrFE) is 0.5%. The liquid crystal and P (VDF/TrFE) are agitated with a stirrer in a sample bottle of which volume is 5 cc. The time is approximately 24 hours.

This material is injected between the attached substrates. The injection is performed by a vacuum injection method, which is generally employed in manufacturing a liquid crystal element.

When this element is driven with a pulse at 5V, a response time of the liquid crystal by applying a pulse is 2 ms and a response time of the liquid crystal by removing pulse potential is 10 ms.

EMBODIMENT 2

Herein, an example in which a liquid crystal material is embodied as an element by employing dispenser and sealing methods (One Drop Filling: ODF) is shown. The mixture of the liquid crystal material and P (VDF/TrFE) (hereinafter, referred to as mixture) that is used is the same as that in Embodiment 1.

A protrusion is further formed in the substrate, shown in Embodiment 1, where the ITO electrode is formed. Herein, an acrylic resin is used for the protrusion. An alignment film is formed and alignment treatment is performed to the substrate where this protrusion is formed. Herein, a material in which azobenzene is added to polyimide is used as the alignment film. The alignment film is irradiated with ultraviolet light of which linear polarization component is extracted by a polarizing filter. The wavelength is 365 nm. Next, a pattern of a sealant is formed by coating the sealant so as to surround the electrode of the substrate. However, in the following process, an opposite substrate needs to be attached; therefore, the sealant is not cured yet at this phase. The seal pattern is formed in this manner and then a liquid crystal is dropped. Note that the sealant to be used is a material having high viscosity for approximately 100 times compared with that in Embodiment 1. This is in order not to melt the dropped liquid crystal with the sealant.

Then, mixture is dropped. The amount of the mixture is 20 µL. After dropping, the opposite substrate is attached. After attaching, a surplus part of the substrates that does not display directly is cut off by using a glass scriber and a breaker to embody as an element.

When this element is driven with a pulse at 5V, a response speed is the same as that in Embodiment 1.

EMBODIMENT 3

FIG. 3A shows a liquid crystal display device in which a signal-line driver circuit 230, a scanning-line driver circuit 238, and a pixel portion 231 are formed over a first substrate 200.

FIG. 3B shows a cross-sectional view taken along A-A' of the liquid crystal display device, and shows the signal-line driver circuit 230 provided with a CMOS circuit having an n-channel TFT 221 and a p-channel TFT 222 over the first substrate 200. The n-channel TFT 221 and the p-channel TFT 222 are formed each to have a crystalline semiconductor film as shown in the above embodiment mode. TFTs for forming the signal-line driver circuit 230 and the scanning-line driver circuit 238 may be formed of a CMOS circuit, a PMOS circuit, or an NMOS circuit.

The pixel portion 231 has a switching TFT 223 and a capacitor element 258. The switching TFT 223 is formed to have a crystalline semiconductor film as shown in the above embodiment mode. The capacitor element 258 includes a gate insulating film sandwiched between a semiconductor film added with impurities and a gate electrode.

The pixel portion 231 has a pixel electrode 211 connected to one of the electrodes of the switching TFT 223. Then, a third insulating film 209 is provided so that the n-channel TFT 221, the p-channel TFT 222, the pixel electrode 211, the switching TFT 223, and the like are covered.

In addition, in a second substrate 245 to be an opposite substrate, a black matrix 251 is provided in a position corresponding to the signal-line driver circuit 230, a color filter 252 is provided in a position corresponding to the pixel portion, and further an opposite electrode 253 is provided. Alignment treatment is performed to such a second substrate 245, and then, the second substrate is attached to the first substrate 200 by using a sealant 243. An epoxy resin is used for the sealant 243. Part of the third insulating film 209 is left in a position where the sealant 243 is formed. Thereafter, a protrusion 250 for preventing a biased distribution of organic ferroelectric particles mixed into a liquid crystal material is formed. Further, a spacer 256 is disposed.

After dropping a liquid crystal layer to the first substrate 200, the second substrate 245 is attached thereto.

Thereafter, the fist substrate 200 and the second substrate 245 are appropriately provided each with a polarizing plate or a circularly polarizing plate.

Moreover, a flexible printed circuit 246 is connected to a conductive film 208 provided in a first connection region 232 through an anisotropic conductive resin (ACF). Then, a video signal or a clock signal to be an external input signal is received through the flexible printed circuit 246. Herein, only the flexible printed circuit is shown; however, a printed wiring board (PWB) is attached through this flexible printed circuit. In addition, an external signal generating circuit is mounted on the printed wiring board.

Further, when the ACF is attached by applying pressure or heat, attention is necessary not to generate a crack because of flexibility of the flexible printed circuit and softening due to heat. For example, a substrate high in rigidity is preferably disposed as an adjunct at least below the first connection region 232.

This embodiment mode shows a driver-integrated display device in which the signal-line driver circuit 230 and the scanning-line driver circuit 238 are provided over the first substrate 200. However, the signal-line driver circuit and the scanning-line driver circuit, which are formed of an IC, may be connected to a signal line, a scanning line, or the like by an SOG method or a TAB method.

As explained above, a liquid crystal display device having an active matrix substrate is manufactured.

EMBODIMENT 4

The following can be given as an example of an electronic device provided with a liquid crystal display device of the present invention: a television device (also simply referred to as a television or a television receiver), a camera such as a digital camera or a digital video camera, a cellular phone device (also simply referred to as a cellular phone handset or a cellular phone), a portable information terminal such as PDA, a portable game machine, a computer monitor, a computer, an audio reproducing device such as a car audio, an image reproducing device provided with a recording medium such as a home game machine, or the like. The specific examples are explained with reference to FIGS. 4A to 4F.

Figure 4A:
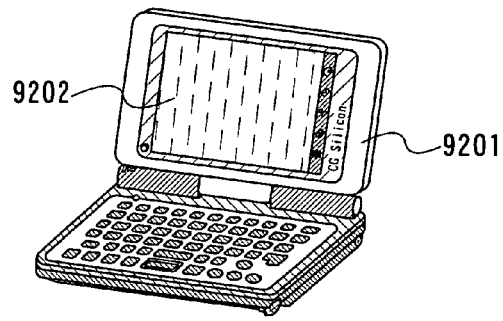
FIGS. 4A to 4F are views each showing an electronic device using a liquid crystal display device according to a certain aspect of the present invention.

A personal digital assistant device shown in FIG. 4A includes a main body 9201, a display portion 9202, and the like. The liquid crystal display device of the present invention can be applied to the display portion 9202. Consequently, the personal digital assistant device is capable of high-speed response; thus, it is possible to provide a personal digital assistant device having an effect that display performance of a moving image is improved.

Figure 4B:
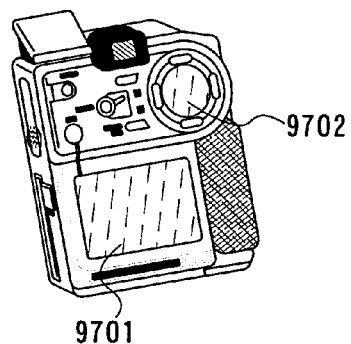

A digital video camera shown in FIG. 4B includes a display portion 9701, a display portion 9702, and the like. The digital video camera is capable of high-speed response by using the liquid crystal display device of the present invention for the display portion 9701; thus, it is possible to provide a digital video camera having an effect that display performance of a moving image is improved.

Figure 4C:
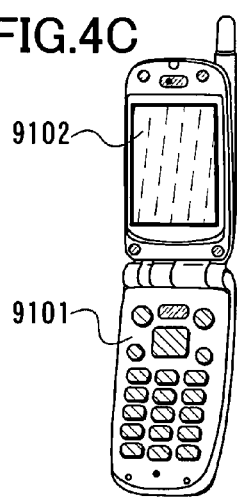

A cellular phone (handset) shown in FIG. 4C includes a main body 9101, a display portion 9102, and the like. The cellular phone is capable of high-speed response by using the liquid crystal display device of the present invention for the display portion 9102; thus, it is possible to provide a cellular phone having an effect that display performance of a moving image is improved.

Figure 4D:
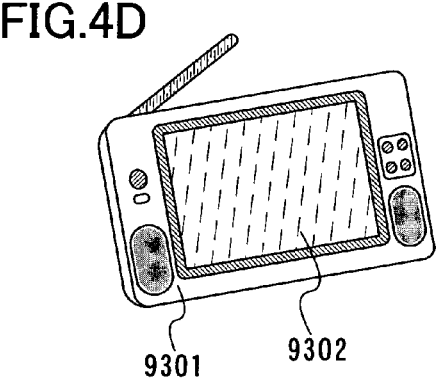

A portable television device shown in FIG. 4D includes a main body 9301, a display portion 9302, and the like. The portable television device is capable of high-speed response by using the liquid crystal display device of the present invention for the display portion 9302; thus, it is possible to provide a portable television device having an effect that display performance of a moving image is improved. In addition, as for a television device, the liquid crystal display device of the present invention can be applied to the wide range of such as a small-sized television for mounting on a portable terminal such as a cellular phone, a portable middle-sized television, and further a large-sized television (for example, 40 inch or more). A portable television device may be merely called a portable television.

Figure 4E:
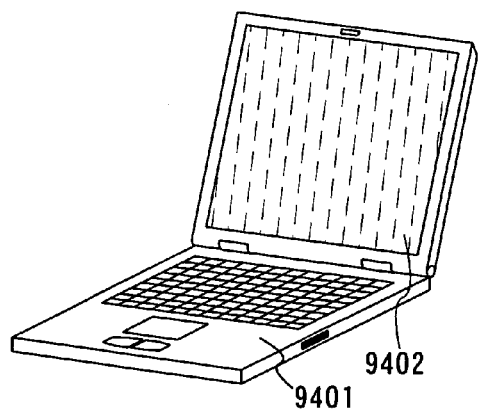

A laptop computer shown in FIG. 4E includes a main body 9401, a display portion 9402, and the like. The laptop computer is capable of high-speed response by using the liquid crystal display device of the present invention for the display portion 9402; thus, it is possible to provide a laptop having an effect that display performance of a moving image is improved.

Figure 4F:
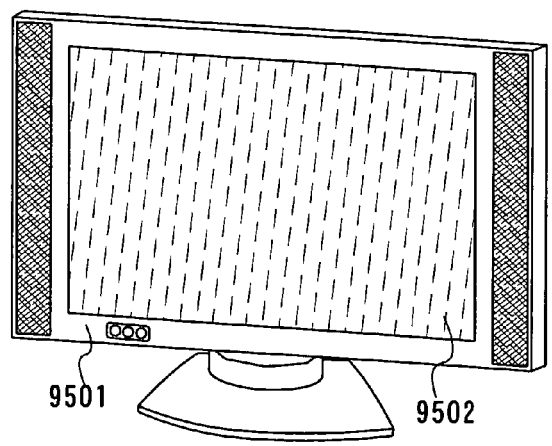

A television device shown in FIG. 4F includes a main body 9501, a display portion 9502, and the like. The television device is capable of high-speed response by using the liquid crystal display device of the present invention for the display portion 9502; thus, it is possible to provide a television display performance of a moving image is improved. A television device may be merely called a television.

By thus using the liquid crystal display device of the present invention, the electronic devices are capable of high-speed response; thus, it is possible to provide a liquid crystal display device having an effect that display performance of a moving image is improved.

The liquid crystal display device of the present invention can be used for an electronic device that requires high-speed response such as a display that mainly displays a moving image.

The present application is based on Japanese Patent Application serial No. 2004-313717 filed on Oct. 28, 2004 in Japanese Patent Office, the contents of which are hereby incorporated by reference.

What is claimed is:

1. A liquid crystal display device comprising:
a first substrate;
a second substrate opposed to the first substrate;
a first electrode and a second electrode interposed between the first substrate and the second substrate; and
a liquid crystal layer interposed between the first electrode and the second electrode,
wherein particles, each comprising an organic ferroelectric material, are dispersed in the liquid crystal layer; and
wherein the organic ferroelectric material is in contact with liquid crystal molecules.

2. The liquid crystal display device according to claim 1, wherein the organic ferroelectric material is a copolymer of vinylidene fluoride and trifluoroethylene.

3. The liquid crystal display device according to claim 1, wherein a weight ratio of the particles with respect to the liquid crystal material is 40% or less.

4. The liquid crystal display device according to claim 1, wherein the diameter of the particles is 10 nm or more and 4 µm or less.

5. The liquid crystal display device according to claim 1, wherein an alignment film is formed over a protrusion.

6. An electronic device having the liquid crystal display device according to claim 1, wherein the electronic device is selected from the group consisting of a personal digital assistant device, a digital video camera, a cellular phone, a laptop computer, and a television.

7. The liquid crystal display device according to claim 1, wherein the liquid crystal is a nematic liquid crystal.

8. A liquid crystal display device comprising:
a first substrate;
a second substrate opposed to the first substrate;
a first electrode and a second electrode interposed between the first substrate and the second substrate; and
a liquid crystal layer interposed between the first electrode and the second electrode,
wherein particles, each comprising an organic ferroelectric material, are dispersed in the liquid crystal layer;
wherein the organic ferroelectric material is in contact with liquid crystal molecules; and
wherein a protrusion is formed in contact with the first electrode.

9. The liquid crystal display device according to claim 8, wherein the organic ferroelectric material is a copolymer of vinylidene fluoride and trifluoroethylene.

10. The liquid crystal display device according to claim 8, wherein a weight ratio of the particles with respect to the liquid crystal material is 40% or less.

11. The liquid crystal display device according to claim 8, wherein the diameter of the particles is 10 nm or more and 4 µm or less.

12. The liquid crystal display device according to claim 8, wherein an alignment film is formed over the protrusion.

13. An electronic device having the liquid crystal display device according to claim 8, wherein the electronic device is selected from the group consisting of a personal digital assistant device, a digital video camera, a cellular phone, a laptop computer, and a television.

14. The liquid crystal display device according to claim 8, wherein the liquid crystal is a nematic liquid crystal.

15. A liquid crystal display device comprising:
a first substrate;
a second substrate opposed to the first substrate;
a first electrode and a second electrode interposed between the first substrate and the second substrate; and
a liquid crystal layer interposed between the first electrode and the second electrode,
wherein particles, each comprising an organic ferroelectric material, are dispersed in the liquid crystal layer;
wherein the organic ferroelectric material is in contact with liquid crystal molecules; and
wherein a protrusion is formed over the first electrode.

16. The liquid crystal display device according to claim 15, wherein the organic ferroelectric material is a copolymer of vinylidene fluoride and trifluoroethylene.

17. The liquid crystal display device according to claim 15, wherein a weight ratio of the particles with respect to the liquid crystal material is 40% or less.

18. The liquid crystal display device according to claim 15, wherein the diameter of the particles is 10 nm or more and 4 µm or less.

19. The liquid crystal display device according to claim 15, wherein an alignment film is formed over the protrusion.

20. An electronic device having the liquid crystal display device according to claim 15, wherein the electronic device is selected from the group consisting of a personal digital assistant device, a digital video camera, a cellular phone, a laptop computer, and a television.

21. The liquid crystal display device according to claim 15, wherein the liquid crystal is a nematic liquid crystal.

22. A liquid crystal display device comprising:
a first substrate;
a second substrate opposed to the first substrate;
a first electrode and a second electrode interposed between the first substrate and the second substrate; and
a liquid crystal layer interposed between the first substrate and the second substrate,
wherein particles, each comprising an organic ferroelectric material, are dispersed in the liquid crystal layer;
wherein the organic ferroelectric material is in contact with liquid crystal molecules;
wherein a protrusion is formed over the first electrode; and
wherein an active element is provided with one of the first and second substrates.

23. The liquid crystal display device according to claim 22, wherein the organic ferroelectric material is a copolymer of vinylidene fluoride and trifluoroethylene.

24. The liquid crystal display device according to claim 22, wherein a weight ratio of the particles with respect to the liquid crystal material is 40% or less.

25. The liquid crystal display device according to claim 22, wherein the diameter of the particles is 10 nm or more and 4 μm or less.

26. The liquid crystal display device according to claim 22, wherein the liquid crystal is a nematic liquid crystal.

27. The liquid crystal display device according to claim 22, wherein an alignment film is formed over the protrusion.

28. An electronic device having the liquid crystal display device according to claim 22, wherein the electronic device is selected from the group consisting of a personal digital assistant device, a digital video camera, a cellular phone, laptop computer, and a television.

29. A liquid crystal display device comprising:
a first substrate;
a second substrate opposed to the first substrate;
a first electrode and a second electrode interposed between the first substrate and the second substrate; and
a liquid crystal layer interposed between the first substrate and the second substrate,
wherein particles, each comprising an organic ferroelectric material, are dispersed in the liquid crystal layer;
wherein the organic ferroelectric material is in contact with liquid crystal molecules;
wherein a protrusion is formed over the first electrode;
wherein an active element is provided with one of the first and second substrates; and
wherein the protrusion is formed between the first electrode and the second electrode.

30. The liquid crystal display device according to claim 29, wherein an alignment film is formed over the protrusion.

31. An electronic device having the liquid crystal display device according to claim 29, wherein the electronic device is selected from the group consisting of a personal digital assistant device, a digital video camera, a cellular phone, laptop computer, and a television.

32. The liquid crystal display device according to claim 29, wherein the liquid crystal is a nematic liquid crystal.

33. The liquid crystal display device according to claim 29, wherein the organic ferroelectric material is a copolymer of vinylidene fluoride and trifluoroethylene.

34. The liquid crystal display device according to claim 29, wherein a weight ratio of the particles with respect to the liquid crystal material is 40% or less.

35. The liquid crystal display device according to claim 29, wherein the diameter of the particles is 10 nm or more and 4 μm or less.

* * * * *